H. J. GRAVES.
WHEEL RIM.
APPLICATION FILED FEB. 25, 1911.
1,013,011.
Patented Dec. 26, 1911.
3 SHEETS—SHEET 3.
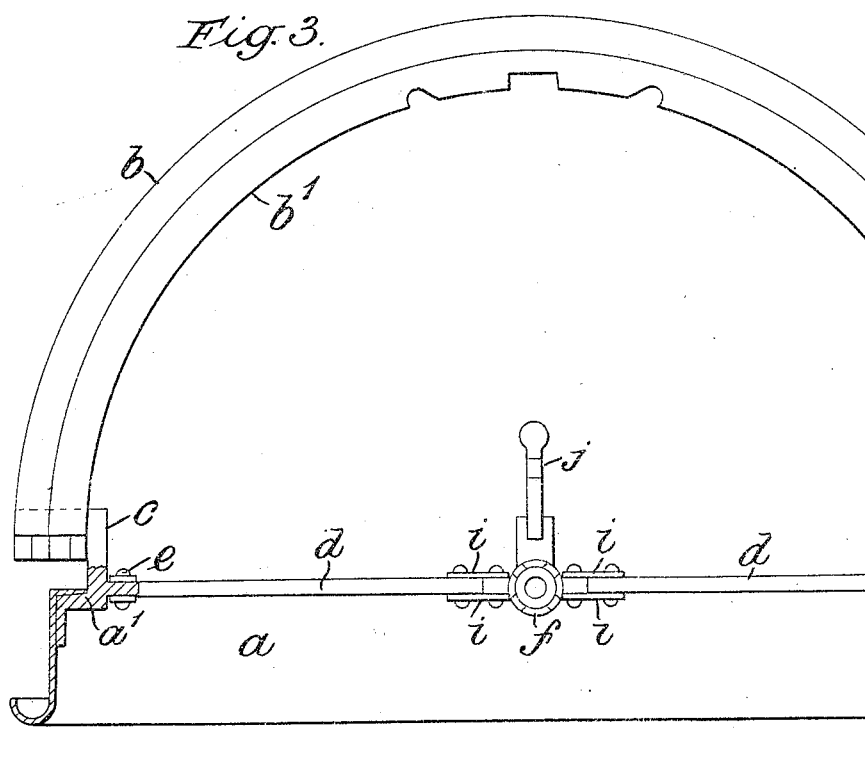
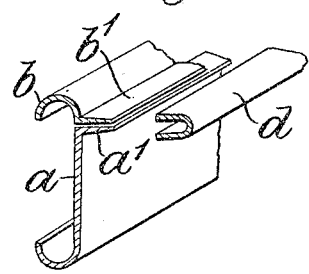
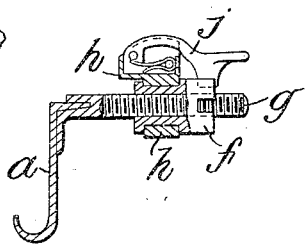
WITNESSES.
INVENTOR,
Henry J. Graves,
BY
ATTY.

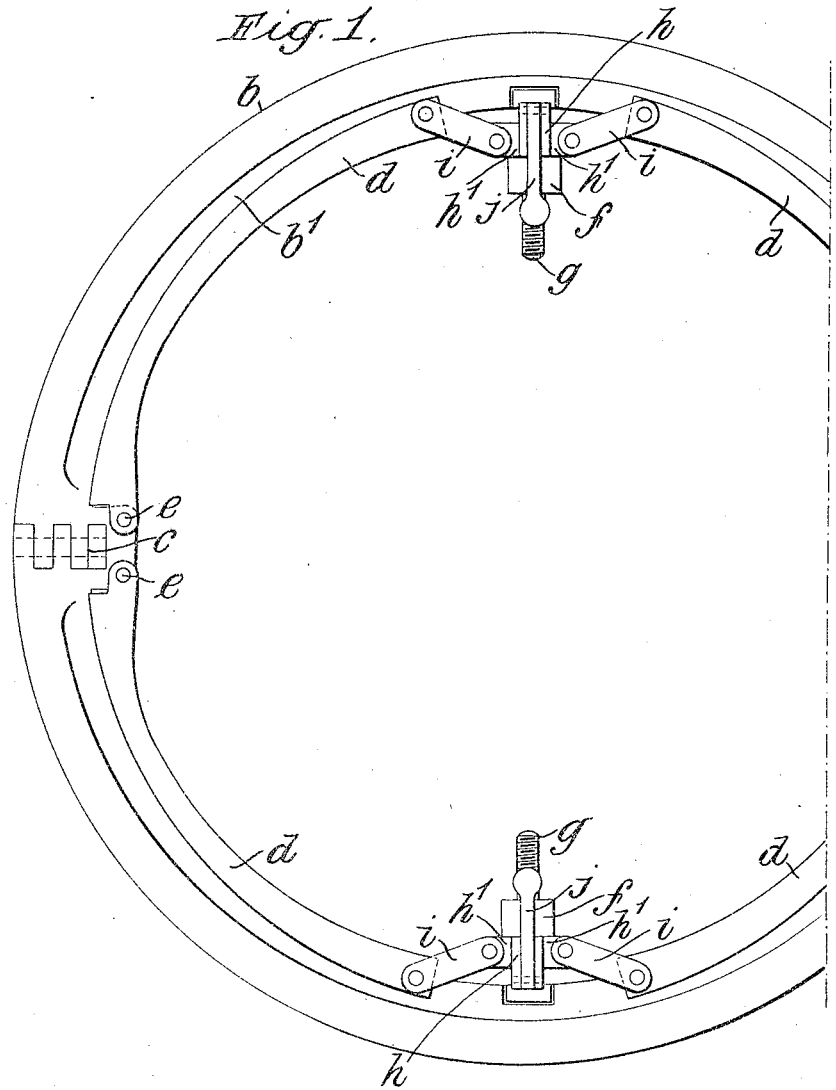

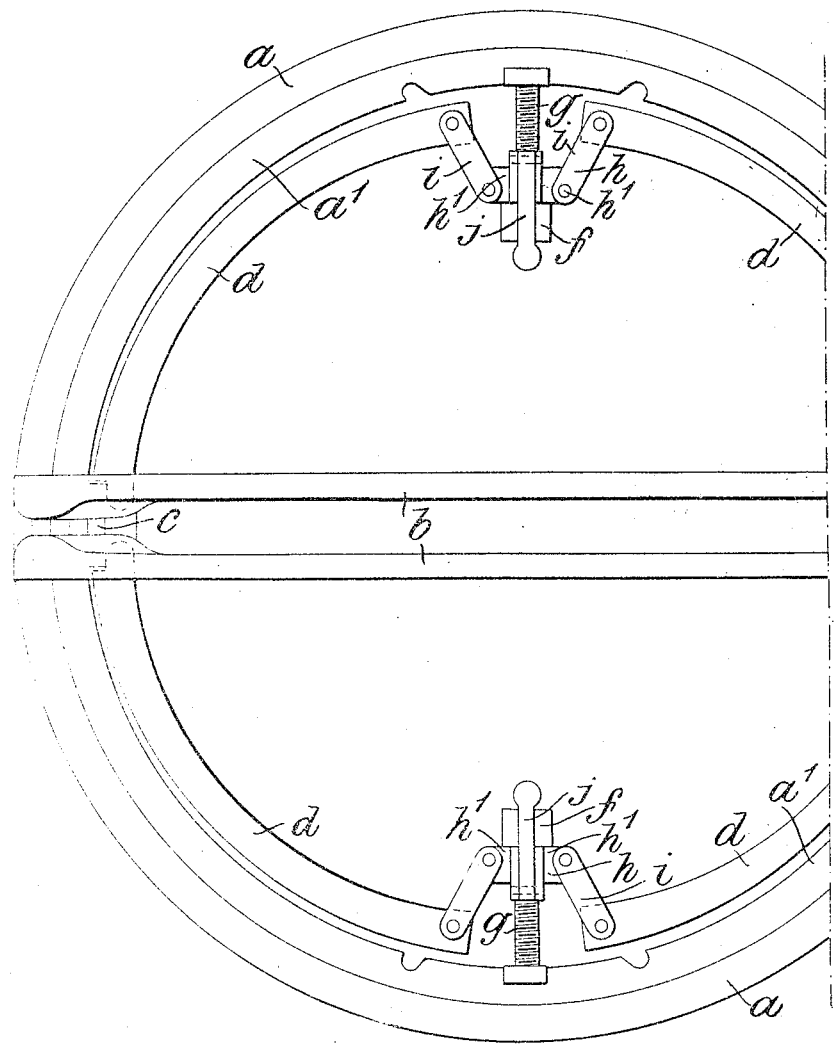

UNITED STATES PATENT OFFICE.

HENRY JAMES GRAVES, OF KENSINGTON, LONDON, ENGLAND.

WHEEL-RIM.

1,013,011.   Specification of Letters Patent.   Patented Dec. 26, 1911.

Application filed February 25, 1911. Serial No. 610,835.

*To all whom it may concern:*

Be it known that I, HENRY JAMES GRAVES, a subject of His Majesty the King of England, residing at 1ᴬ Addison road north, Kensington, in the county of London, Kingdom of England, have invented a certain new and useful Improved Wheel-Rim, of which the following is a specification.

This invention relates to improvements in wheel rims for pneumatic or other tires for use on road vehicles of the kind in which the rim flange is formed in sections which are hinged to the body of the rim.

The invention is illustrated in the drawings accompanying this specification, in which:—

Figure 1 is an elevation of a wheel rim showing the hinged flange in position; Fig. 2 is a similar view showing the flange when opened for placing a tire in position; Fig. 3 is a sectional elevation with the flange in a similar position to that shown in the previous figure; Fig. 4 is a sectional view of the component parts constituting the wheel rim, and Fig. 5 is a side elevation of the adjusting nut and its locking means.

The outside beaded flange of the wheel rim $a$ is as shown made in two parts or halves $b$ $b$, that are hinged to the rim $a$ at $c$ $c$ at diametrically opposite points; thus allowing each half of the said outer flange to be swung away from the main body of the rim $a$ when putting on or taking off a tire. Thus there is no flange over which the tire has to be stretched except at the pivoted points $c$ $c$ which do not in the least interfere with such operations.

The body of the rim $a$ that takes the tire extends throughout the circumference of the wheel at one side of the rim and is preferably made in one piece of rolled steel or other metal and is provided with an inwardly directed flange $a'$ to correspond with a similar flange $b'$ $b'$ on the hinged flange portions $b$ $b$ when in their normal positions. The hinged flanges or rim portions $b$ $b$ are located at the opposite side of the rim from the fixed body or rim portion and extend throughout the circumference of the wheel.

To secure the hinged flanges or rim portions in engagement with the fixed portions or body of the wheel rim I provide a plurality of channel shaped sections or members $d$ that are hinged to the main body of the wheel rim at $e$ so that they can be adjusted in the plane of the wheel to bring them into or withdraw them from engagement with the flanges $a'$ $b'$. The four channel segments or segmental sections $d$ are arranged to engage with nearly the whole inner circumferences of the rim flanges $a'$ $b'$ and their expansion and contraction is determined by a pair of castellated nuts $f$ $f$ that are in screwed engagement with a pair of inwardly directed screwed pins $g$ $g$ attached to the rim $a$. These adjustment devices of the channel rims $d$ are disposed at diametrically opposite points on the wheel rim and midway between the pivots $e$ of the said channels. A sliding block $h$ is mounted in engagement with each castellated nut $f$ and is also connected by means of lugs $h'$ $h'$ and links $i$ $i$ with the free ends of the channel segments $d$; thus when the nuts are screwed down as in Fig. 1 the links or toggle members cause the segments $d$ to expand and engage with the flanges $a'$ $b'$, while when they are unscrewed they cause the links to close up into the position shown in Fig. 2 and withdraw the segments.

When the segments $d$ are withdrawn from engagement with the flanges $a'$ $b'$ the flanges $b$ $b$ can be swung outward or away from the rim $a'$.

Locking devices are provided to secure the castellated nuts $f$ in their adjusted positions and may as shown conveniently comprise a small spring trigger $j$ $j$ pivoted in a slot on each block $h$ $h$ so as to engage when closed up with one of the openings in the castellated nut.

What I claim as my invention and desire to secure by Letters Patent is:—

1. A wheel rim comprising a flanged rim portion, a pair of semi-circumferential flanges hinged thereto, an internal flange on the rim portion, a corresponding internal flange on each of the semi-circumferential portions, and a plurality of hinged channel segments adapted to swing into and out of engagement with the internal flanges on the rim and flange portions to hold them in position for the purpose described.

2. A wheel rim comprising a flanged rim portion, a pair of semi-circumferential flanges hinged thereto, an internal flange on the rim portion, a corresponding internal flange on each of the semi-circumferential portions, a plurality of hinged channel segments arranged to swing into and out of engagement with the internal flanges of the rim and the flange portions to hold them in position, screws connected with the rim portion, nuts engaging the screws, sliding blocks carried by the nuts, and links or toggle members connected to the sliding blocks and to the channel segments, substantially as described.

3. A wheel rim comprising a fixed rim portion extending throughout the circumference of the wheel at one side of the rim, and a plurality of hinged rim portions extending throughout the circumference of the wheel at the opposite side of the rim, a series of segmental channel sections hinged to the fixed rim portion and arranged to swing into and out of engagement with both of the said rim portions to lock and release the hinged rim portions, and means for securing the channel sections in their engaging position.

In testimony whereof I affix my signature in the presence of two witnesses.

HENRY JAMES GRAVES.

Witnesses:
J. C. ALLTRED,
W. C. LOVLES.